(12) United States Patent
Szekely

(10) Patent No.: US 10,968,572 B2
(45) Date of Patent: Apr. 6, 2021

(54) FROST RESISTANT SURFACE

(71) Applicant: Engineered Plastics Inc., Williamsville, NY (US)

(72) Inventor: Kenneth E. Szekely, Oakville (CA)

( * ) Notice: Subject to any disclaimer, the term of this patent is extended or adjusted under 35 U.S.C. 154(b) by 508 days.

(21) Appl. No.: 14/376,586

(22) PCT Filed: Feb. 4, 2013

(86) PCT No.: PCT/US2013/024623
§ 371 (c)(1),
(2) Date: Aug. 4, 2014

(87) PCT Pub. No.: WO2013/116832
PCT Pub. Date: Aug. 8, 2013

(65) Prior Publication Data
US 2015/0034067 A1    Feb. 5, 2015

Related U.S. Application Data (60) Provisional application No. 61/594,172, filed on Feb. 2, 2012.

(51) Int. Cl.
| | | |
|---|---|---|
| *E01C 11/24* | (2006.01) | |
| *H05B 3/56* | (2006.01) | |
| *E04B 1/92* | (2006.01) | |
| *E01C 11/26* | (2006.01) | |
| *H05B 3/26* | (2006.01) | |
| *F24D 13/02* | (2006.01) | |
| *F24D 3/14* | (2006.01) | |
| *E01C 5/00* | (2006.01) | |

(52) U.S. Cl.
CPC .............. *E01C 11/245* (2013.01); *E01C 5/00* (2013.01); *E01C 11/265* (2013.01); *E04B 1/92* (2013.01); *F24D 3/142* (2013.01); *F24D 3/148* (2013.01); *F24D 13/024* (2013.01); *H05B 3/267* (2013.01); *H05B 3/56* (2013.01); *F24D 2200/08* (2013.01); *H05B 2203/003* (2013.01); *H05B 2203/014* (2013.01); *H05B 2203/026* (2013.01); *H05B 2214/02* (2013.01); *Y02B 30/24* (2013.01); *Y02B 30/26* (2013.01); *Y10T 428/24942* (2015.01)

(58) Field of Classification Search
CPC ........ E01C 5/00; E01C 11/265; E01C 11/245; E04B 1/92; F24D 3/142; F24D 3/148; F24D 3/024; H05B 3/267; H05B 3/56
USPC ....... 219/209, 212, 213, 217, 218, 476, 480, 219/528, 544, 549; 392/432, 435, 436
See application file for complete search history.

(56) References Cited

U.S. PATENT DOCUMENTS

3,569,672 A * 3/1971 Hurko .................... F24C 15/102
126/400
4,855,567 A * 8/1989 Mueller ................ F25D 23/021
219/213
(Continued)

*Primary Examiner* — Ibrahime A Abraham
*Assistant Examiner* — Justin C Dodson
(74) *Attorney, Agent, or Firm* — Stephen Kenny (57) ABSTRACT

Methods, systems and devices for making a pedestrian, vehicular, or other surface resistant to frost, snow and ice by use of heat are disclosed. A composite base or deck element includes a recess to accommodate heating element. A thermal insulator has an upward facing layer of heat-conductive aluminum foil, above which sits the heating element. On top is a pedestrian, vehicular, or other exposed surface, for example a tactile warning surface.

9 Claims, 10 Drawing Sheets

(56) References Cited

U.S. PATENT DOCUMENTS

| | | | | |
|---|---|---|---|---|
| 5,461,213 A * | 10/1995 | Rodin | F24D 13/024 | 219/213 |
| 5,550,350 A * | 8/1996 | Barnes | E01C 11/265 | 219/213 |
| 5,605,418 A * | 2/1997 | Watanabe | E01C 11/265 | 219/528 |
| 5,637,247 A * | 6/1997 | Flynn, Jr. | H05B 3/06 | 219/213 |
| 6,330,980 B1 * | 12/2001 | Fiedrich | F24D 3/14 | 237/69 |
| 6,825,444 B1 * | 11/2004 | Tuan | E01C 11/265 | 14/73 |
| 6,875,954 B2 * | 4/2005 | DeBenedetto | E04D 13/103 | 219/212 |
| 7,021,372 B2 * | 4/2006 | Pickard | F24D 3/141 | 165/168 |
| 7,189,025 B1 * | 3/2007 | Greer | E01C 11/222 | 404/19 |
| 2004/0245234 A1 * | 12/2004 | Gehring | H05B 3/36 | 219/213 |
| 2008/0083833 A1 * | 4/2008 | Blanke | E04F 15/18 | 237/69 |
| 2008/0283513 A1 * | 11/2008 | Ferguson, III | A01K 1/0353 | 219/217 |

* cited by examiner

FROST RESISTANT SURFACE

CROSS-REFERENCE TO RELATED APPLICATIONS

This application claims the benefit of U.S. Provisional Application 61/594,172, filed Feb. 2, 2012, which is hereby incorporated herein by reference in its entirety.

SUMMARY

Methods, systems and devices for making a pedestrian, vehicular, or other surface resistant to frost, snow and ice by use of heat are disclosed.

DETAILED DESCRIPTION

Surfaces for pedestrians, vehicles, or other traffic are susceptible to frost, snow and ice. The most straightforward way of preventing or resisting freezing on a traffic surface is to maintain the surface at sufficiently high temperature to prevent water from condensing and freezing on the surface. Heating a flooring or decking surface outdoors can present a number of problems.

One possible heat source is ground heat. After sunset, the ground cools by radiational heating, leading to the formation of frost overnight. But soil, cement, and stone are poor thermal conductors, i.e., good thermal insulators. Thus, while the surface temperature drops overnight, heat is retained below the surface of the ground. Flooring or decking tiles that are also made of thermal insulators, such as plastics/polymers, plastic/polymer composites, epoxy, fiberglass, concrete, cement, etc., will behave similarly to the surrounding, thermally-insulating ground in which the tiles are embedded. But an embedded flooring or decking tile that is constructed to be more thermally conductive than the surrounding ground may exploit latent ground heat to keep its temperature higher than the surrounding ground and avoid being covered with frost, snow or ice.

Figure 1:
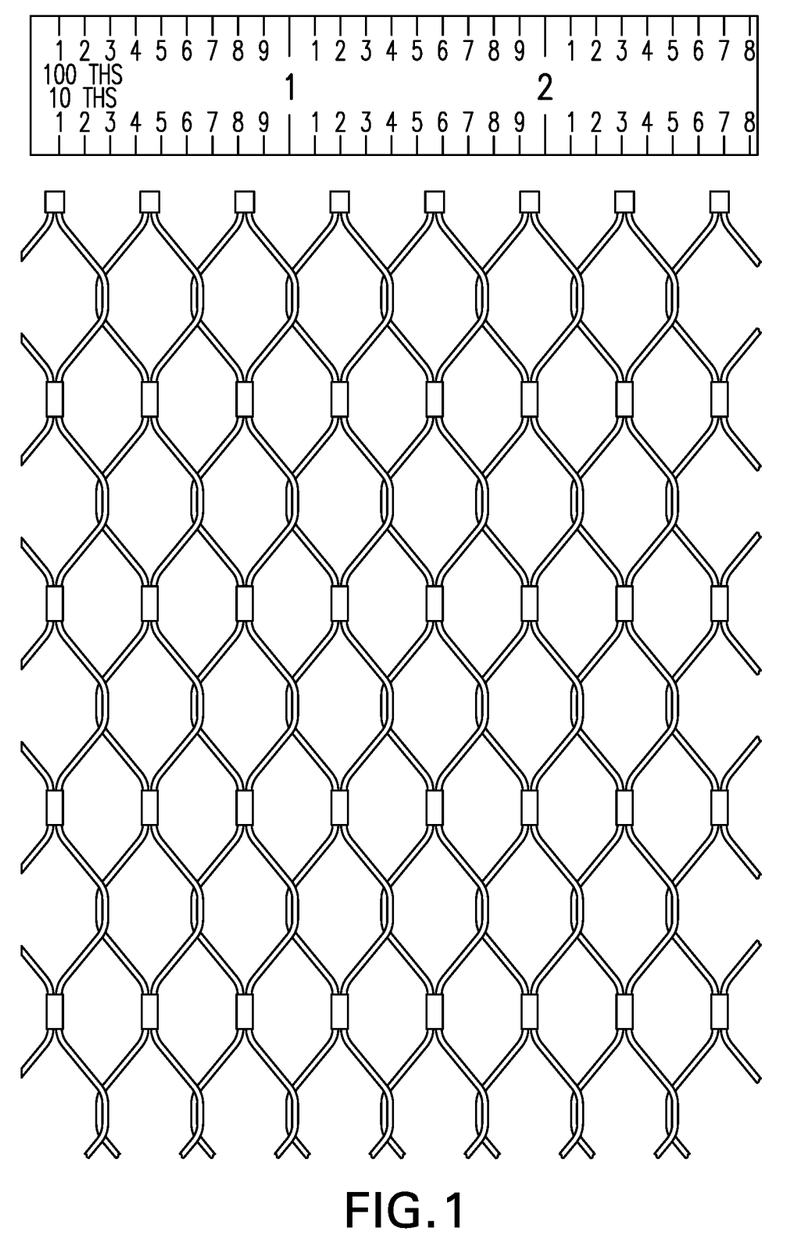
FIG. 1 is a photograph of a metal mesh.
Figure 2:
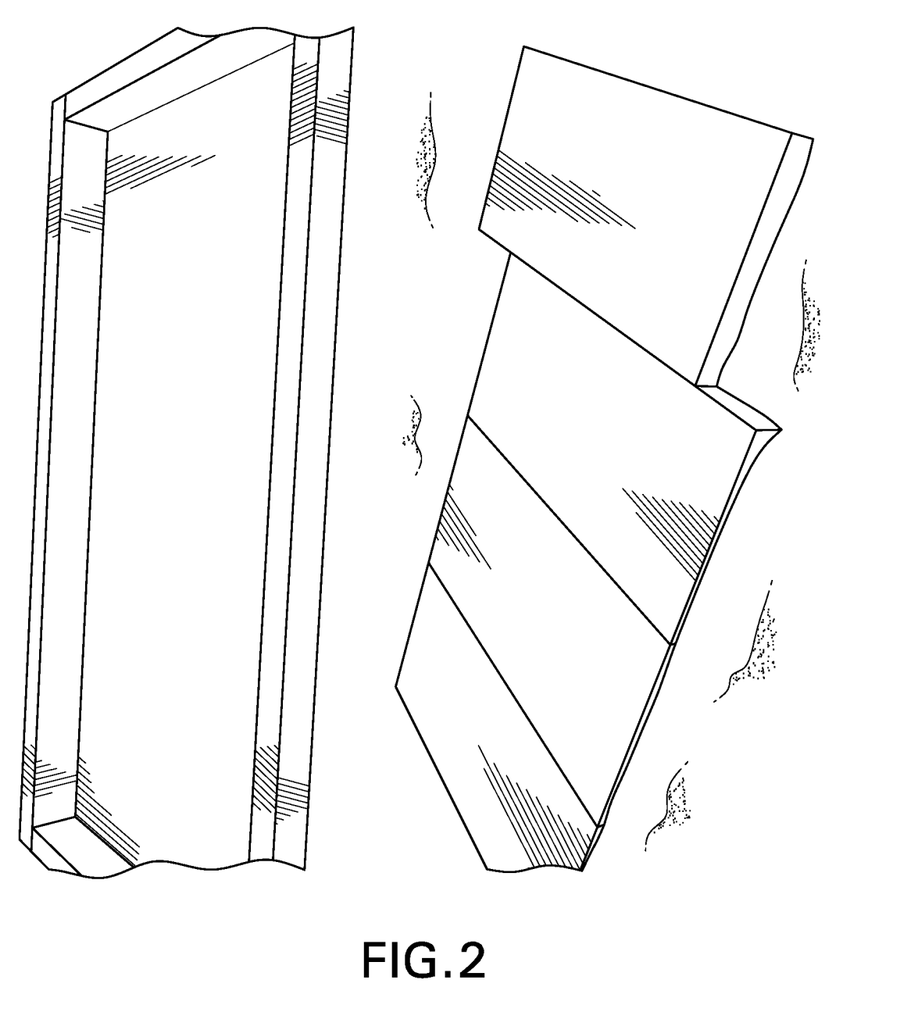
FIG. 2 is two photographs of a tile including a metal foil.

For example, laminated composite tiles often include layers of polymer and glass fibers. Such tiles are poor thermal conductors. To make such a tile more thermally conductive, one or more layers of a good heat conductor, such as aluminum or other metal, can be added to the laminate. In some embodiments the heat conductor can be an extruded layer of, for example aluminum, or can be a mesh or foil. The thermal conductor can be included on the underside of the tile or embedded within the tile. Adding a layer of aluminum mesh to the interior of a laminate tile has been found to increase thermal conductivity and reduce the formation of frost on the upper surface when the tile is installed in the ground. In some embodiments, an aluminum layer can be added to one side of the tile, for example the underside, or throughout the vertical extent of the tile. Examples of aluminum meshes are shown in FIG. 1. The heat conductor can also be formed as a foil. FIG. 2 shows such a foil applied to the underside of a tactile warning surface tile. The heat conductor promotes the transfer of heat (from whatever source) from the bottom of the tile to the top, and also helps to evenly distribute heat horizontally.

Embedding a thermal conductor, such as aluminum, in what would otherwise be a thermally-insulating tile, such as an polymer-glass composite tile, results in the best of both worlds. The tile is strong and lightweight, like other polymer-glass composite tiles. The polymer-glass composite in the tile is also an electrical insulator, unlike a purely metal tile, meaning it can be used on mass transit platforms near electrified rails or overhead wires without fear of transmitting electricity in case of an accident. But the tile also contains enough thermally conductive material, e.g., metal, to distribute heat effectively, both vertically and horizontally.

In some cases it is also beneficial to form thin tiles or surface units, e.g., 3 inches rather than 6 inches, to keep the upper surface closer to the source of the ground heat.

In addition to passively making use of ground heat, surfaces and surface tiles can also be actively heated by including electrical or hydronic heating elements. One drawback of embedding active heating elements under a permanently installed surface is the difficulty of maintenance or replacement. This difficulty can be overcome by forming a surface with a removable top to allow access to the active heating elements. In some cases it is beneficial to keep such a removable top as thin as possible so that the active heating elements are as close to the surface as possible. The thin, removable top can incorporate a thermal conductor, as described above, to encourage heat to flow up to, and horizontally along, the exposed surface, where frost, snow and ice are to be avoided.

Active heating can be controlled in known ways using existing temperature and humidity sensing systems. Frost only forms under particular meteorological conditions. An electronic controller with a thermostat and a humidistat can be employed to activate electric or hydronic heating only when weather conditions make frost possible or likely.

One particularly advantageous use of the above-described frost resistant surfaces is in tactile warning surfaces (TWS). TWS's are required by the Americans with Disabilities Act Accessibility Guidelines (ADAAG) at a variety of locations, to communicate to the visually impaired that they are approaching a street or other potential hazard, such as the edge of a mass transit platform. Tiles with TWS surfaces can be formed from composite materials and are often embedded in concrete. Either passive or active heating, combined with a laminated conductor, can help make a TWS tile resistant to frost as explained above.

Frost resistant surfaces may also be particularly advantageous at locations where frost is particularly likely to form, such as on bridges.

In a particular embodiment, a frost-resistant surface can be obtained as follows. A foundation is formed, for example, from compacted gravel or concrete or the like. A prefabricated unit is then laid down on the foundation. The unit can include a bottom layer of heat insulator, such as polystyrene foam. The unit will include a deck element. If present, the insulation layer will typically be attached to or integral with the deck element. The deck element can include grooves, channels or other guides designed to receive active heating elements such as electrical or hydronic heating elements. Active heating elements can then be installed in the deck. A heat conducting layer, e.g., aluminum, can then be laid down on top of the deck and heating elements. Finally, an exposed upper surface tile can be laid down on top of the heat conducting layer. The heat conducting layer functions to spread heat from the heating elements to the entire surface tile. The heat conducting layer may be separate from, attached to, or integral with the upper surface tile.

Figure 3:
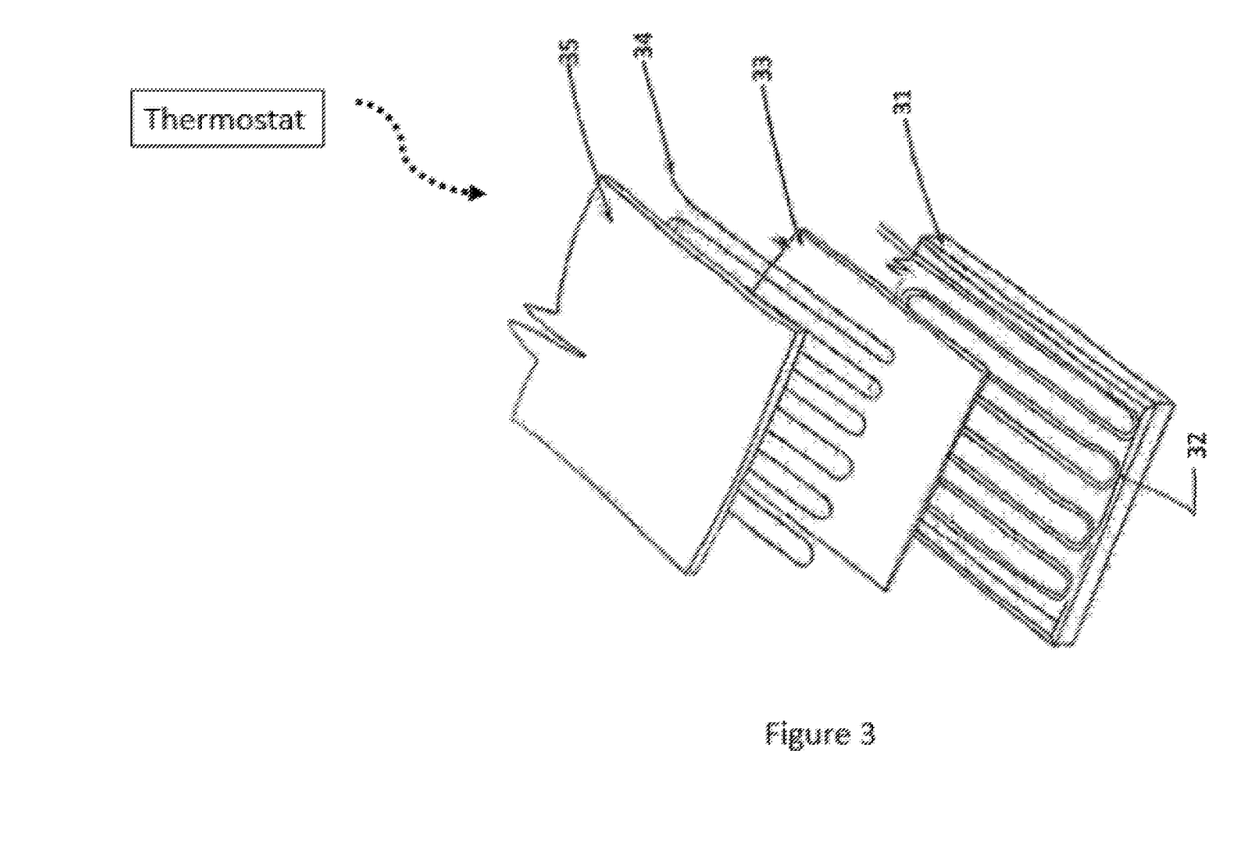
FIG. 3 shows schematically one embodiment of an actively heated system.
Figure 4:
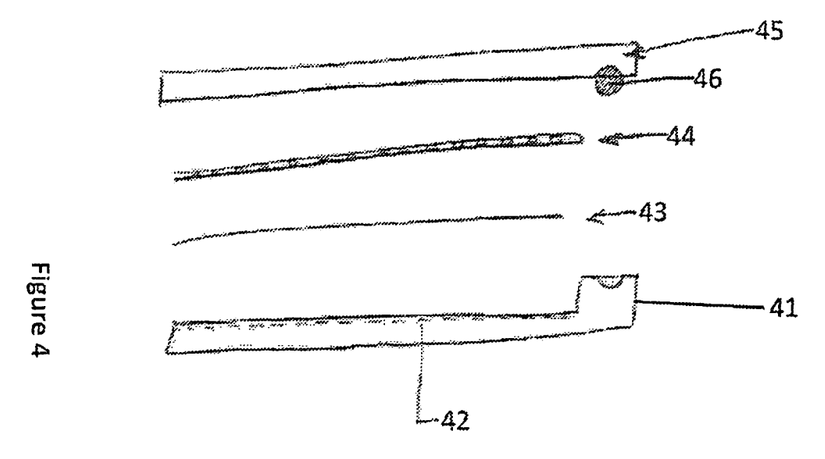
FIG. 4 shows schematically a different view of the same embodiment as FIG. 3.
Figure 5:
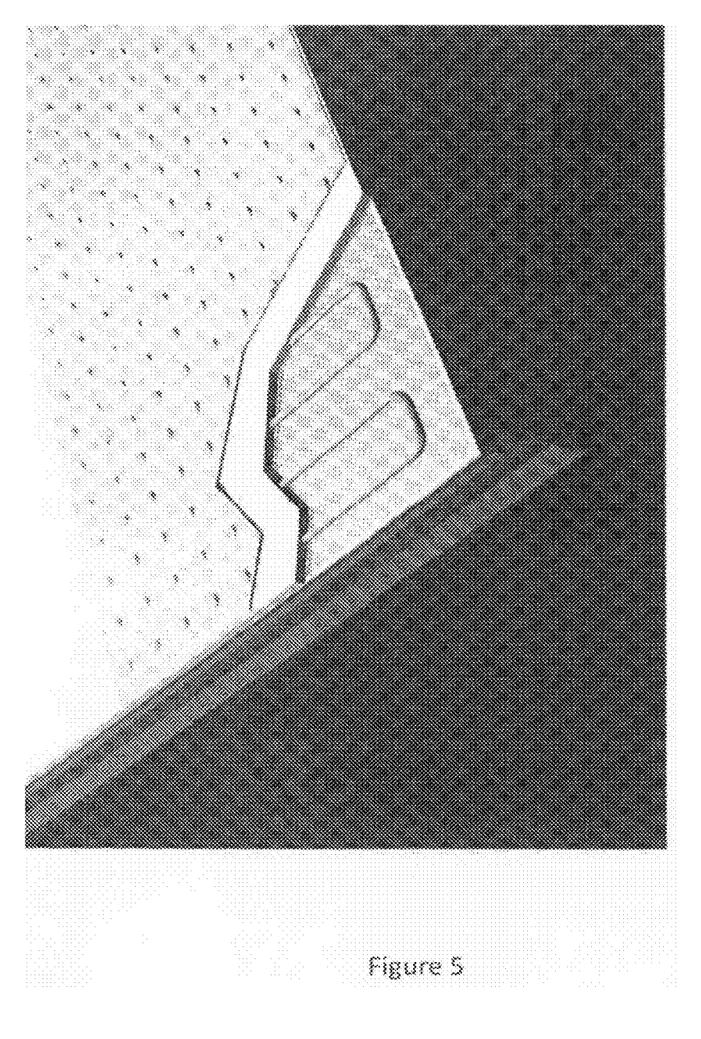
FIG. 5 shows schematically an alternative arrangement of active heating elements in a frost-resistant deck.
Figure 6:
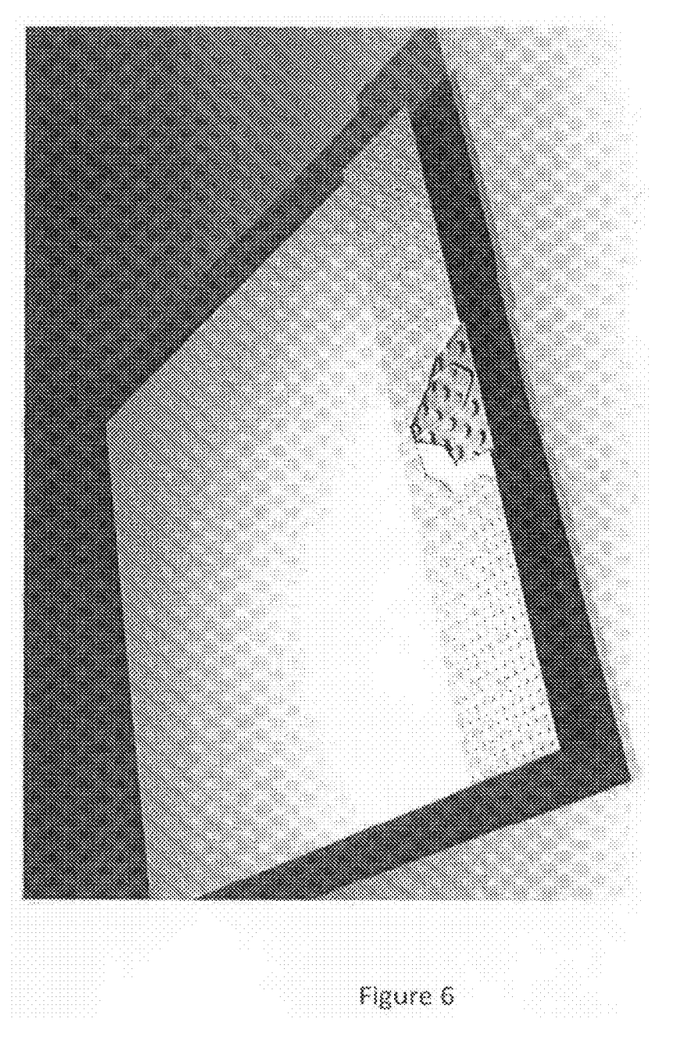
FIG. 6 shows schematically an alternative arrangement of active heating elements in a frost-resistant deck.

An example is shown schematically in FIG. 3. A composite base or deck element 31 includes a recess 32 to accommodate heating element 34. A thermal insulator 33 has an upward facing layer of heat-conductive aluminum foil, above which sits the heating element 34. On top is a pedestrian, vehicular, or other exposed surface 35, for example a tactile warning surface. FIG. 4 schematically shows a side-view cross-section of a similar example. The deck element 41 includes a recess 42. A thermal insulator with a layer of thermally conductive material 43 is between the deck 41 and a heating element 44. Uppermost is a surface tile 45. In this case the example also shows a rubber seal 46 that seats in the deck element 41 and is compressed against the surface tile 45. Alternatively, layer 33/43 can include only insulation with the heat conducting layer elsewhere, for example, embedded in the surface tile. Also, layer 33/43 can include only a heat conductor, with an insulating layer located, for example, in or under the deck element. FIGS. 5 and 6 show similar but alternative arrangements of a heated tile system.

Such a system has the heating elements located close to the exposed surface and insulated from the foundation. This has the advantage that the heating elements are tasked with heating only that portion of the structure where heat is needed, namely, the exposed surface. Heat does not generally travel to the underlying foundation. This is beneficial from an efficiency standpoint in that heat is not wasted on material that need not be warmed, for example a deeply buried portion of the system. The disclosed systems are also more efficient in that, by heating only a small amount of material, this system can warm up quickly. A system which heats, for example, a six- to twelve-inch-thick concrete slab, may take many hours or even days to get up to temperature. Since inclement weather can be difficult to forecast with certainty as much as a day in advance, a user of such a system may simply turn on the heat when winter starts and leave the system idling until warm weather returns, an inefficient use of heating energy. By heating a relatively small amount of material, this system requires less start-up time and can be turned on only when inclement weather seems likely, avoiding days and weeks of inefficient idling at high temperature.

Because the system shown is modular, it also has the advantage of easy replaceability of tiles. In addition, because the exposed surface and heat conducting layer are easy to remove and replace, it is likewise easy to access the heating elements, unlike heating elements embedded in a concrete slab, which can only be accessed by destroying the concrete, e.g., by jackhammer. Heating elements can easily be repaired or replaced. The deck can be designed to accept multiple types of heating elements, e.g., electric or hydronic. The easy access also allows a user to switch from one type of heating element to another.

Figure 7:
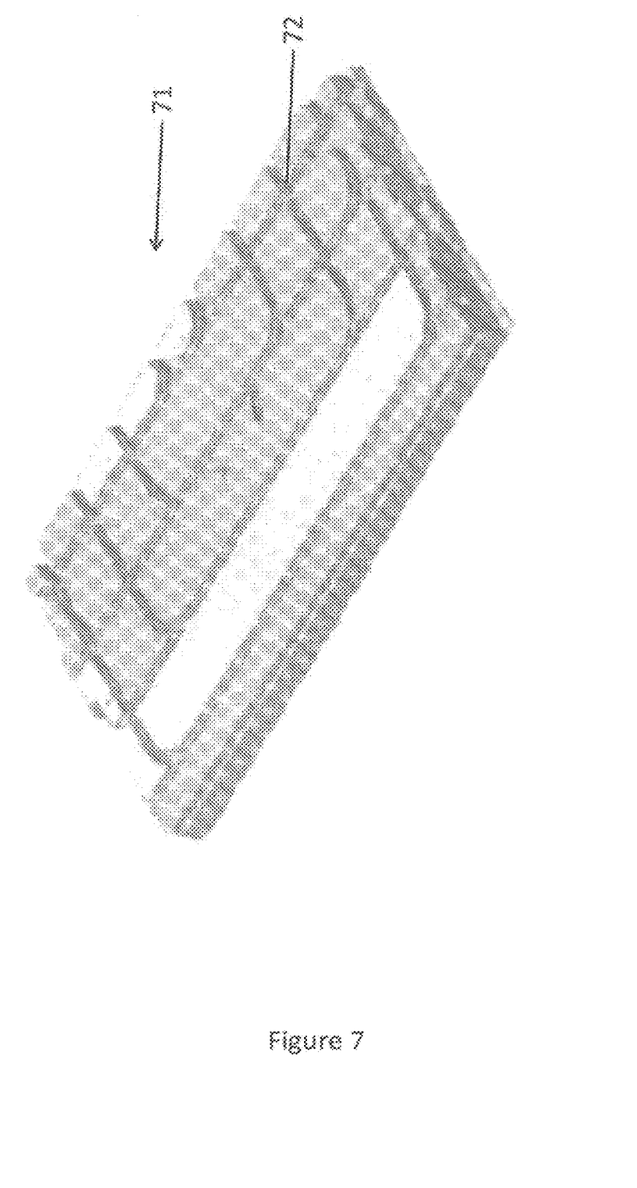
FIG. 7 shows schematically a modular deck element.

The modular deck elements 71 shown in FIG. 7 are designed to offer a variety of possible configurations. As shown, the modular system is configured to be used on a rail platform. The deck element includes grooves 72 in which heating elements, e.g., electric wires or hydronic conduits, can be run. The heating elements can be run straight from one end of the deck element to the other. Or the heating elements can be turned through a right-angle curve, or even through a 180 degree switch-back. This allows the user a wide variety of options in configuring the deck and heating elements.

Figure 8:
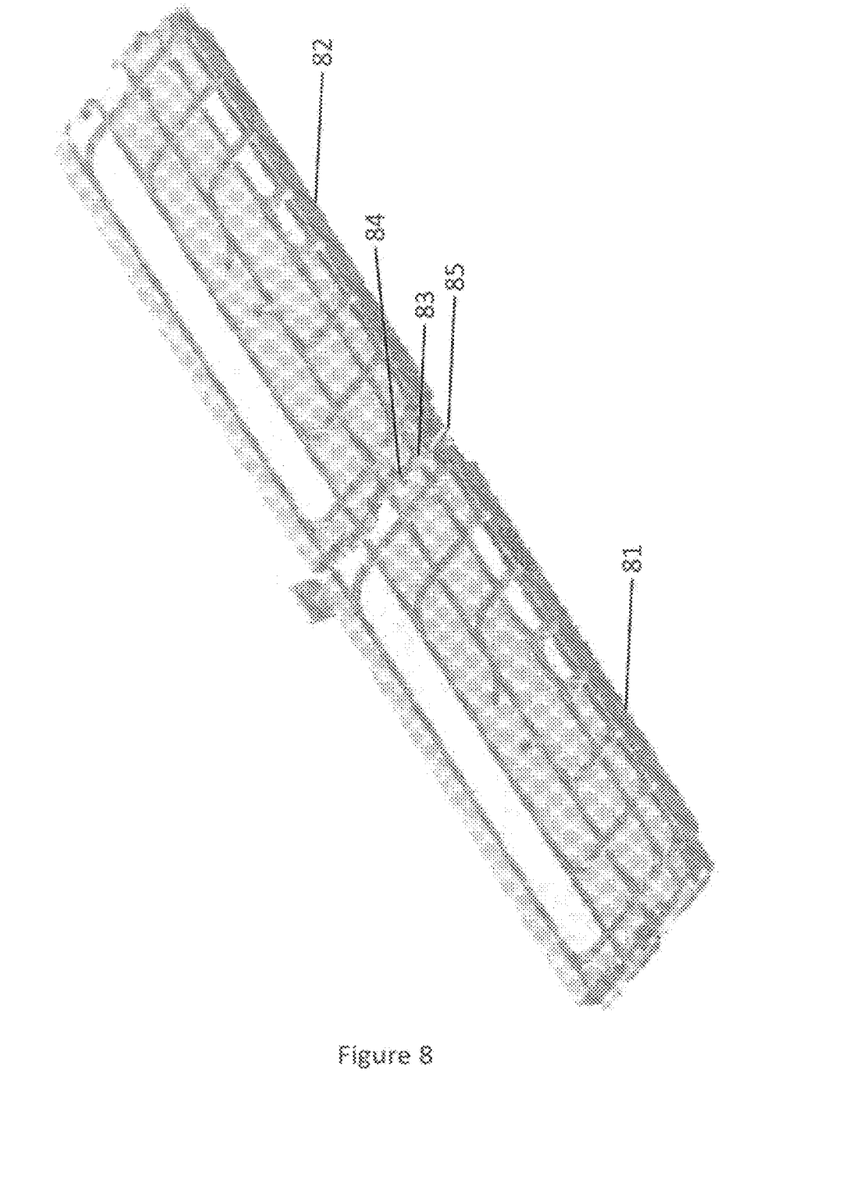
FIG. 8 shows schematically a joint system for attaching modular deck elements to one another.

The deck elements also include a joint system, shown in FIG. 8, designed to allow the system to differentially expand and contract without buckling or otherwise being damaged. Because the joints are not entirely rigid but rather hinged, deck elements are allowed to have some vertical and horizontal play. This is beneficial in a system such as this one, where significant temporal and spatial differences in temperature are to be expected. Linear expansion of the deck elements relative to underlying foundation could, in theory lead to displanar movement. Because the deck elements are linked to one another with a bendable hinge, if one element is angled upwards by expansion, the adjacent elements will necessarily go with it. This attachment between adjacent deck elements will then result in a "crown", rather than a raised edge where one deck element is proud of the adjacent element. Tiles emerging proud of their neighbors is a result particularly to be avoided in pedestrian surfaces where such exposed edges can become a tripping hazard.

Figure 9:
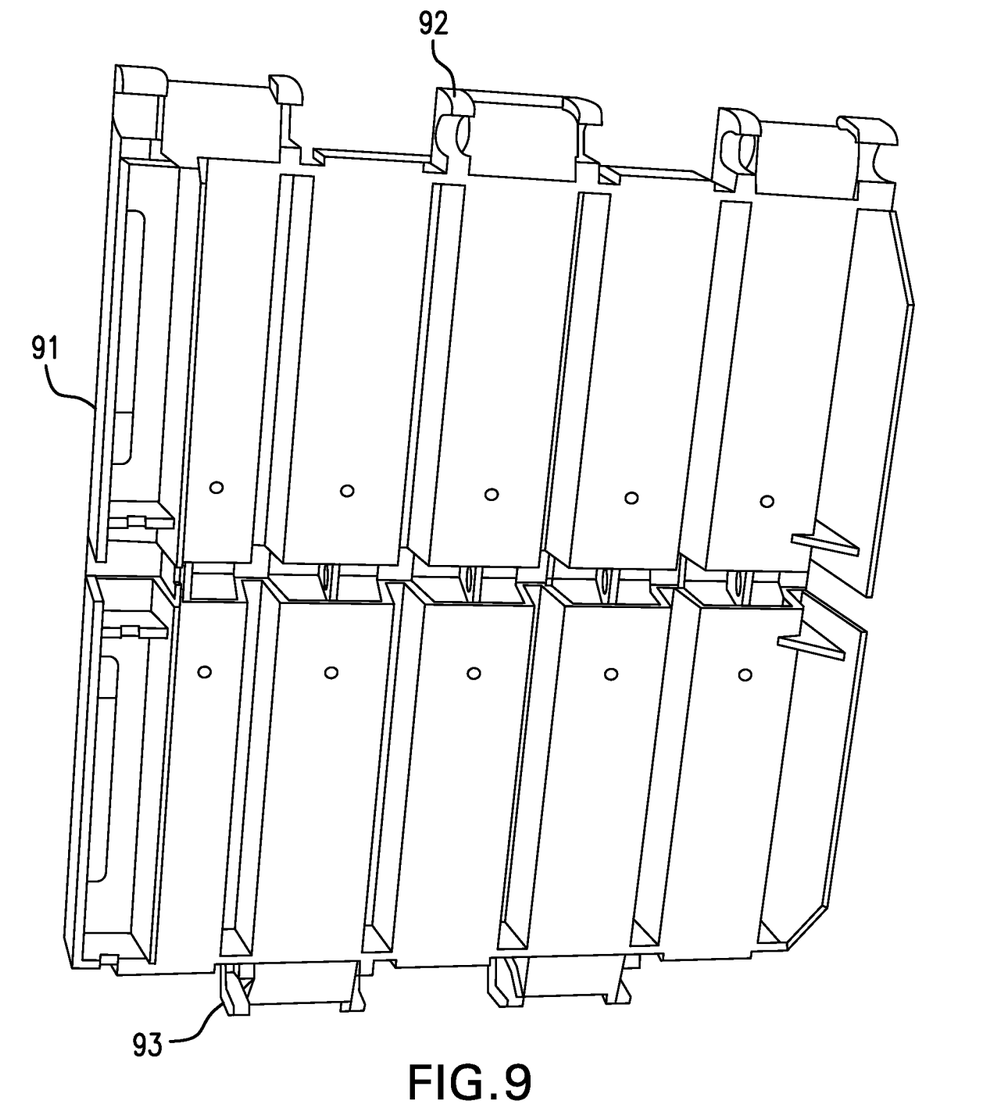
FIG. 9 shows schematically an alternative embodiment of a deck element.
Figure 10:
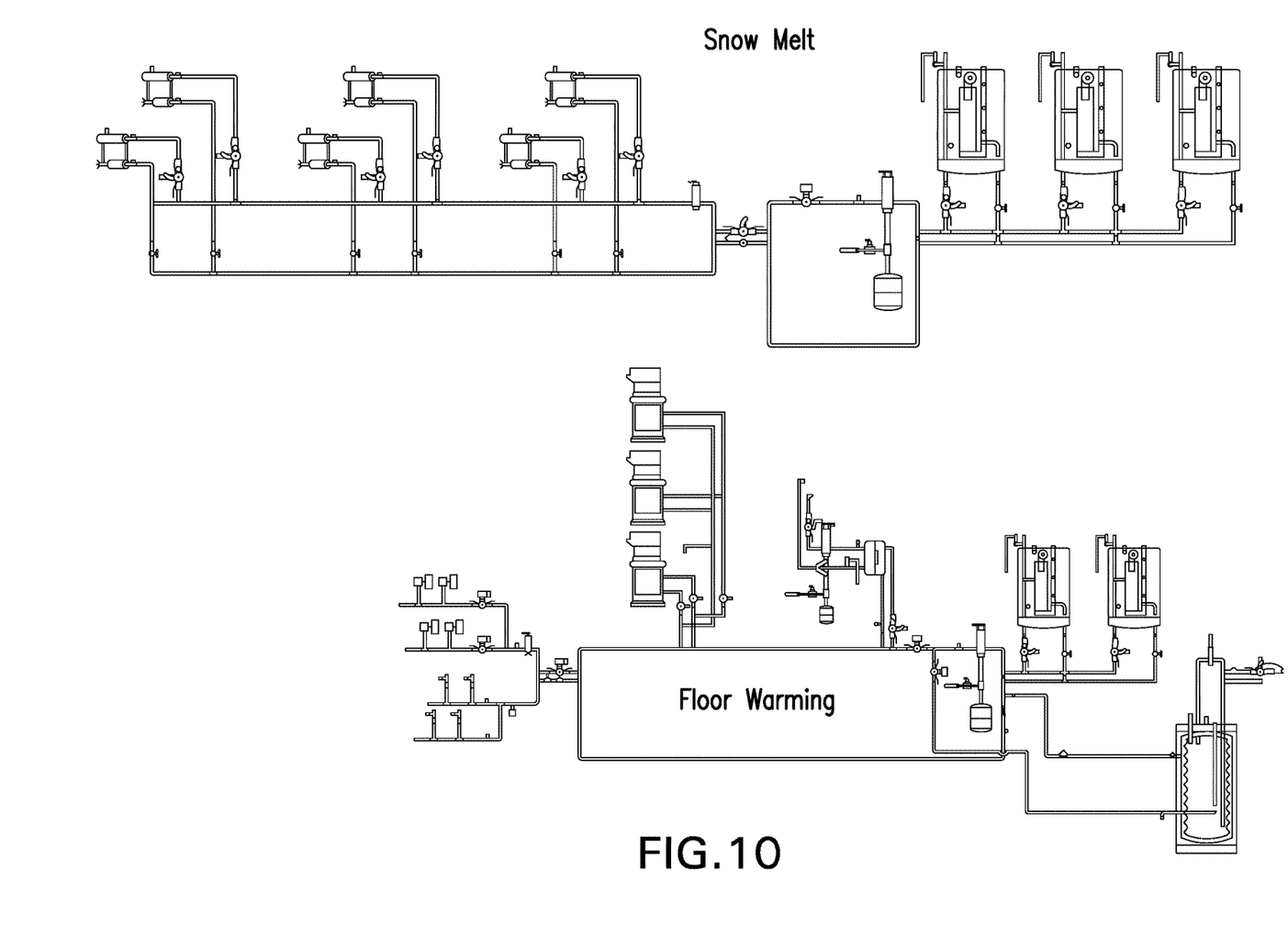
FIG. 10 depicts the controller and sensor components.

In the particular embodiment shown in FIG. 8, the deck elements 81, 82 include barrels 83, 84 that interleave to form a generally cylindrical space when the two elements 81, 82 are mated. The hinged joint is formed by inserting a rod 85 through the space formed by the interleaved barrels. The space need not be cylindrical and in particular, an oval cross-section can be advantageous. In this particular embodiment the joint is similar to a butt hinge. The combination of an oval space with a cylindrical rod can allow for lateral expansion or contraction of the decking elements without buckling. FIG. 9 shows an alternative embodiment of a deck element 91 with cylindrical barrels 92 designed to interleave with the barrels 93 of an adjacent deck element. As with the embodiment shown in FIG. 8, a rod inserted through the barrels 92, 93 would hold two deck elements 91 together.

The heating elements can be secured in the deck elements by clips that seat in the grooves or channels of the deck elements. Regardless of the type of heating element to be secured, the outer surface of the clips is designed to mate with the channels. The interior of the clip is heating-element specific. If the heating element is a relatively large hydronic line, the interior opening of the clip will be large. If the heating element is a relatively small electrical wire, the interior opening of the clip will be smaller to fit snugly around the wire. The interior opening of the clip is designed to mate with the particular chosen heating element, while the exterior of the clip is designed to mate with the channels of the deck elements no matter what heating elements are to be used. Alternatively, the deck elements may be constructed with channels sized to accommodate a particular type of heating element.

A flooring tile can include a top side configured for traffic, such as vehicular or pedestrian traffic, a bottom side configured for anchoring to a substrate, at least one substantially horizontal layer of metallic, thermally conductive material, and at least one substantially horizontal layer of non-metallic material that is substantially less thermally conductive than the layer of metallic material. The metallic material can include, for example, a foil or a mesh. The metallic material may extend substantially throughout the vertical extent of the tile or may be vertically narrow compared to the rest of the tile. The non-metallic material can include or can be an polymer-glass composite, which can be electrically. The top side can be or include a tactile warning surface. The non-metallic material may be or include an electrical insulator. In some embodiments, the entire vertical extent of the tile is no greater than three inches.

A system can include a substantially horizontal layer of thermal insulation, a substantially horizontal first deck element above the layer of thermal insulation, the first deck element including a groove sized and shaped to receive a heating element, an active heating element seated in the groove, a substantially horizontal layer of thermally conductive material above the first deck element and heating element, a substantially horizontal surface tile above the layer of thermally conductive material, and a controller operatively connected to the active heating element so as to be able to activate and deactivate the heating element. The active heating elements can be, for example, hydronic or electrical heating elements. In some embodiments the system includes a thermostat configured to maintain the surface tile at a desired temperature. In some embodiments the system also includes a sensor operatively connected to the controller, the sensor being capable of sensing one or more meteorological conditions predictive of the formation of frost. The sensor can send to the controller a signal indicative of meteorological conditions predictive of the formation of frost, and the controller can be programmed to use that signal as a trigger to activate the heating elements. The system can include a clip configured to secure the heating element to the first deck element. The surface tile can include a tactile warning surface. The surface tile can be removably secured to the first deck element in such a way that a user can remove the surface tile from the first deck element, expose the heating element, and secure the surface tile element back to the first deck element without permanently damaging either the surface tile or the first deck element. The system can also include a second deck element secured to the first deck element with a hinge. For example, the hinge can be formed as a butt hinge by a rod inserted through a cylindrical space formed between the two deck elements.

A frost resistant-surface can be installed by depositing, above a foundation, a substantially horizontal layer of a first thermal insulator, depositing, above the layer of the first thermal insulator, a first deck element including a groove sized and shaped to receive a heating element, depositing so that it is seated in the groove of the first deck element, an active heating element, depositing, above the first deck element and active heating element; a layer of thermally conductive material, depositing, above the layer of thermally conductive material, a surface tile. In some embodiments, the first thermal insulator and the first deck element are attached to one another and are deposited simultaneously. In some embodiments the layer of thermally conductive material and the surface tile are attached to one another and are deposited simultaneously.

Additionally, installation can include depositing, above a foundation, a substantially horizontal layer of a second thermal insulator, depositing, above the layer of the second thermal insulator, a second deck element including a groove sized and shaped to receive a heating element, wherein the first and second deck elements each have interleaving portions defining cylindrical openings that are aligned to form collectively a single cylindrical channel, and attaching the first deck element to the second deck element by inserting a rod through the cylindrical channel formed collectively by the two deck elements.

I claim:

1. A frost resistant tile system consisting of:
   a layer of thermal insulation;
   a first deck element, the first deck element having an upper surface and lower surface defining a thickness therebetween, the lower surface of the first deck element disposed above the layer of thermal insulation, the first deck element including a groove sized and shaped to receive a heating element;
   a heating element seated in the groove, the heating element having an upper surface and lower surface defining a thickness therebetween with the lower surface of the first deck element disposed below the lower surface of the heating element;
   at least one clip disposed within the groove of the first deck element with the heating element releasably secured in the at least one clip,
     the at least one clip having an interior surface and an outer surface, the interior surface having a contour complimentary to the geometry of the heating element, the outer surface having a contour complimentary to the geometry of the groove of the first deck element;
   a layer of metallic thermally conductive material above at least a portion of the upper surface of the first deck element and disposed directly above the heating element;
   a surface tile above the layer of thermally conductive material; and
   a controller electrically connected to the heating element so as to be able to activate and deactivate the heating element.

2. The system of claim 1 wherein the controller includes a thermostat configured to maintain the surface tile at a desired temperature.

3. The system of claim 1 wherein the heating element is a hydronic heating element.

4. The system of claim 1 wherein the heating element is an electrical heating element.

5. The system of claim 1 wherein the upper surface tile has a tactile warning surface.

6. The system of claim 1 wherein the controller includes a sensor capable of sensing a thermostat value and sending to the controller a signal to activate the heating element.

7. The system of claim 1 wherein the controller includes a sensor capable of sensing a humidistat value and sending to the controller a signal to activate the heating element.

8. The system of claim 1, wherein the layer of thermal insulation is integral to the first deck element.

9. The system of claim 1, wherein the first deck element is of unitary construction.

* * * * *